United States Patent [19]

Bormioli

[11] Patent Number: 4,509,718
[45] Date of Patent: Apr. 9, 1985

[54] BALL VALVE WITH ROTARY-TRANSLATORY MOVEMENT FOR FLUID PRODUCTS AT VERY HIGH OR VERY LOW TEMPERATURE

[76] Inventor: Giorgio Bormioli, Via Galileo Galilei, 11 - 35100 Padova, Italy

[21] Appl. No.: 499,325

[22] Filed: May 31, 1983

[30] Foreign Application Priority Data

Oct. 27, 1982 [IT] Italy ............................... 23948 A/82

[51] Int. Cl.³ .......................................... F16K 25/00
[52] U.S. Cl. ..................................... 251/163; 251/188
[58] Field of Search ................ 251/161, 162, 163, 188

[56] References Cited

U.S. PATENT DOCUMENTS

| | | | |
|---|---|---|---|
| 2,879,798 | 3/1959 | Anderson | 251/163 X |
| 3,245,653 | 4/1966 | Lauigueur | 251/163 X |
| 3,403,886 | 10/1968 | Barker | 251/163 |
| 3,675,894 | 7/1972 | Friedell | 251/163 |
| 3,894,714 | 7/1975 | Whittaker | 251/163 X |
| 4,029,292 | 6/1977 | Kramer | 251/163 |

FOREIGN PATENT DOCUMENTS

2250414 9/1972 France ............................... 251/161

Primary Examiner—Harold W. Weakley
Attorney, Agent, or Firm—Shlesinger, Fitzsimmons & Shlesinger

[57] ABSTRACT

A ball valve includes a ball with rotary-translatory movement fitted in a duct section. A control device allows to execute the valve closure through the continuous rotation of a single control shaft, firstly with a movement of single rotation and then with a movement of single translation.

5 Claims, 22 Drawing Figures

BALL VALVE WITH ROTARY-TRANSLATORY MOVEMENT FOR FLUID PRODUCTS AT VERY HIGH OR VERY LOW TEMPERATURE

The present invention relates to a ball valve with rotary-translatory movement for fluid products at very high or very low temperature.

It is known that to assure a perfect seal of a ball valve at very high or very low temperature (such as those caused by the passage of fluids at corresponding temperature) is generally a serious problem.

A valid system is to give the ball not only the usual rotary movement, but also the translatory one, so as to make easy the first movement, but at the same time to assure, with the second movement, the due seal coupling against the fixed seat.

In such case it is not simple to realize an operating mechanism which allows the most suitable sequence of movements and on the other hand it is required that the chosen sequence can be executed by action on a single control member.

The object of the present invention is just to realize a ball valve for fluid products at very high or very low temperature, which provides a suitable combination of rotation and translation movements under the control of a single actuating member.

According to the invention such an object has been reached by means of a ball with rotary-translatory movement, comprising a duct section which can be passed through by a fluid product, a ball which can be moved to closing and opening positions with sequential movements of rotation and translation and a control device able to cause everyone of said sequential movements through the continuous rotation of a single control shaft, characterized in that said control device comprises a first rotating body integral with said control shaft, a second rotating body and connection and release means, which are responsive to a closing rotation of said control shaft to firstly keep said rotating bodies integral with each other and then to stop said second rotating body and to free said first rotating body therefrom, and viceversa when an opening rotation of said control shaft occurs, and said ball is coupled to said rotating bodies of the control shaft so that their integral rotation causes a movement of mere rotation of the ball around an axis perpendicular to that of said duct section and the rotation of the first rotating body only with second rotating body being immovable in its turn causes a movement of mere translation in a direction perpendicular to the above mentioned axis.

In such a way, by means of a simple control device only based on the use of two rotating bodies and by suitable connection and release means for the same rotating bodies, it is obtained the advantageous result that a continuous rotation of a single control shaft causes the sequential execution of two really different movements, and above all a final (if in closing operation) or initial (if in opening operation) movement of translation which allows to realize (with closed valve) a condition of perfect seal even if in theoretically unsuitable situations such as those of very high or very low work temperature. This would not be evidently possible if the final (or initial) translation was accompanied by a contemporaneous rotating component.

These and other features of the present invention will be made evident by the following detailed description of two possible embodiments illustrated by way of non-limitative example in the enclosed drawings, in which.

With reference to FIGS. 1-4, there is shown a ball valve, which inside a fixed outer body 1 realized in the shape of a duct section and provided with opposite holes 2 and 3 for the inlet and outlet of the fluid product houses a control member or "ball" with sequential movement of rotation and translation, to which the reference number 4 is assigned.

Figure 1:
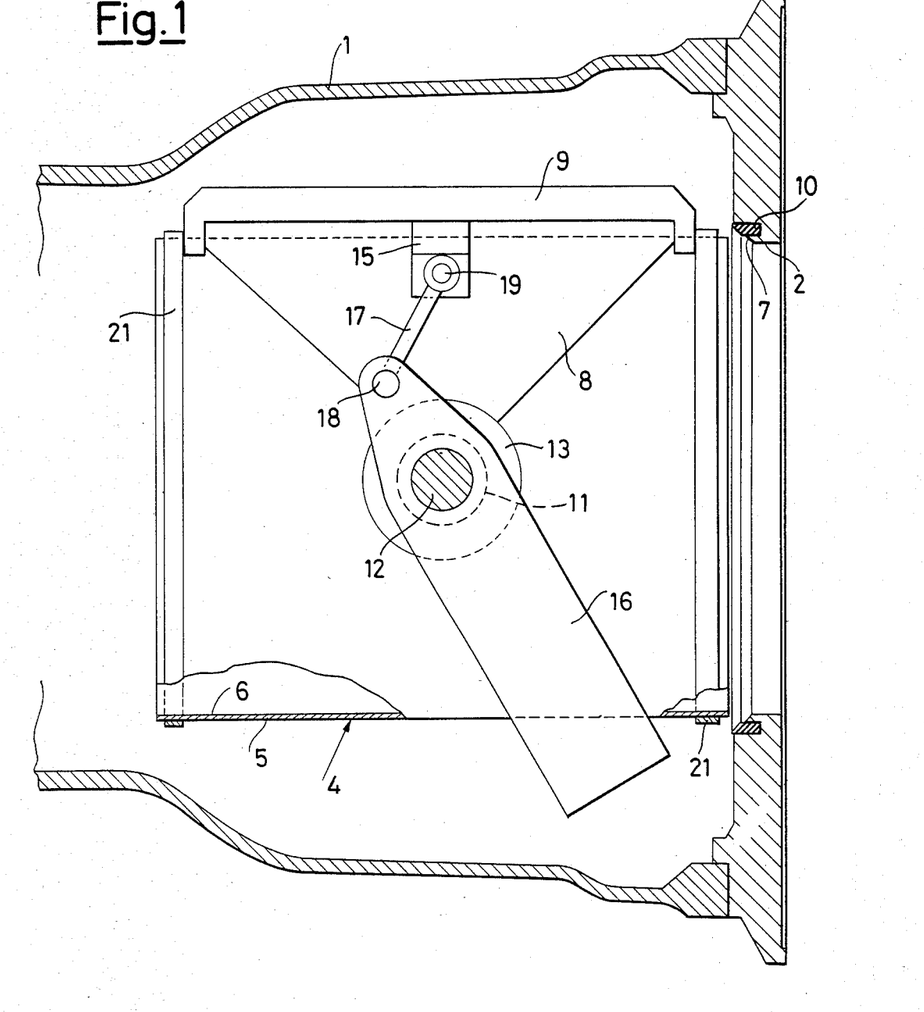
FIGS. 1-3 show in top plan, with the outer body sectioned, a ball valve according to the invention in the several opening, intermediate rotation without translation and closing positions.
Figure 2:
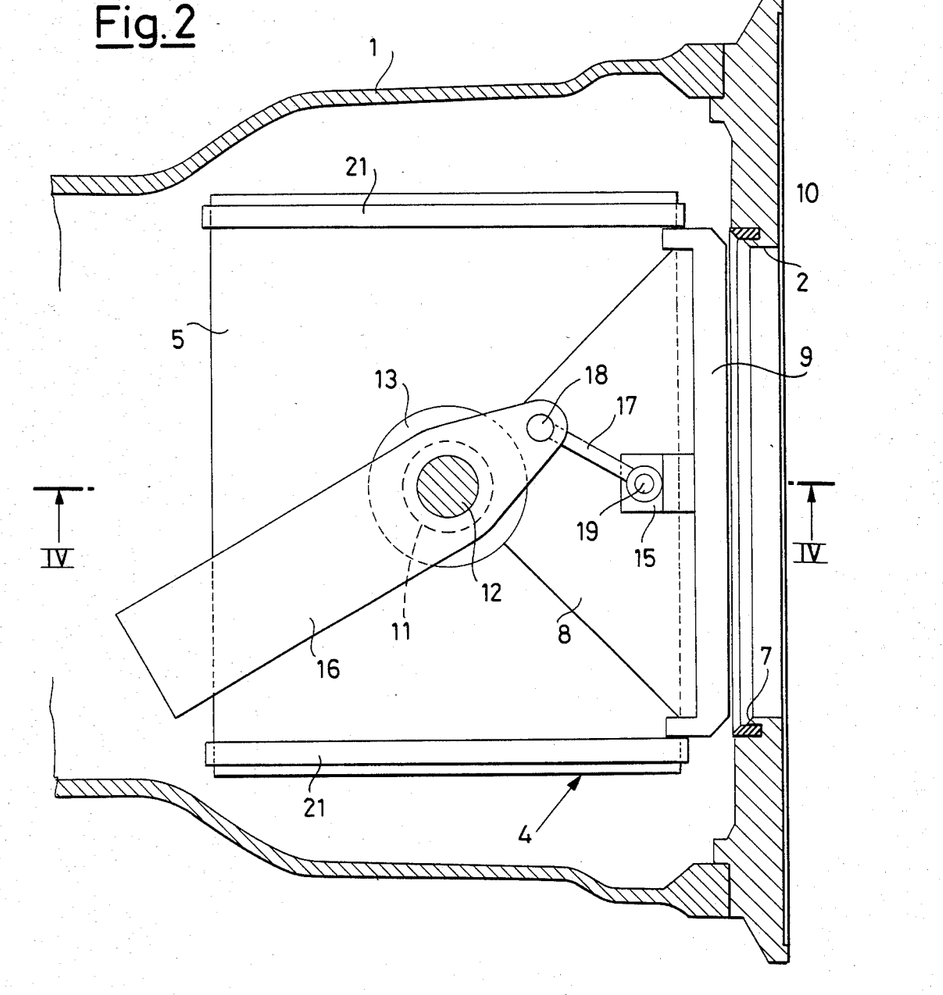
Figure 3:
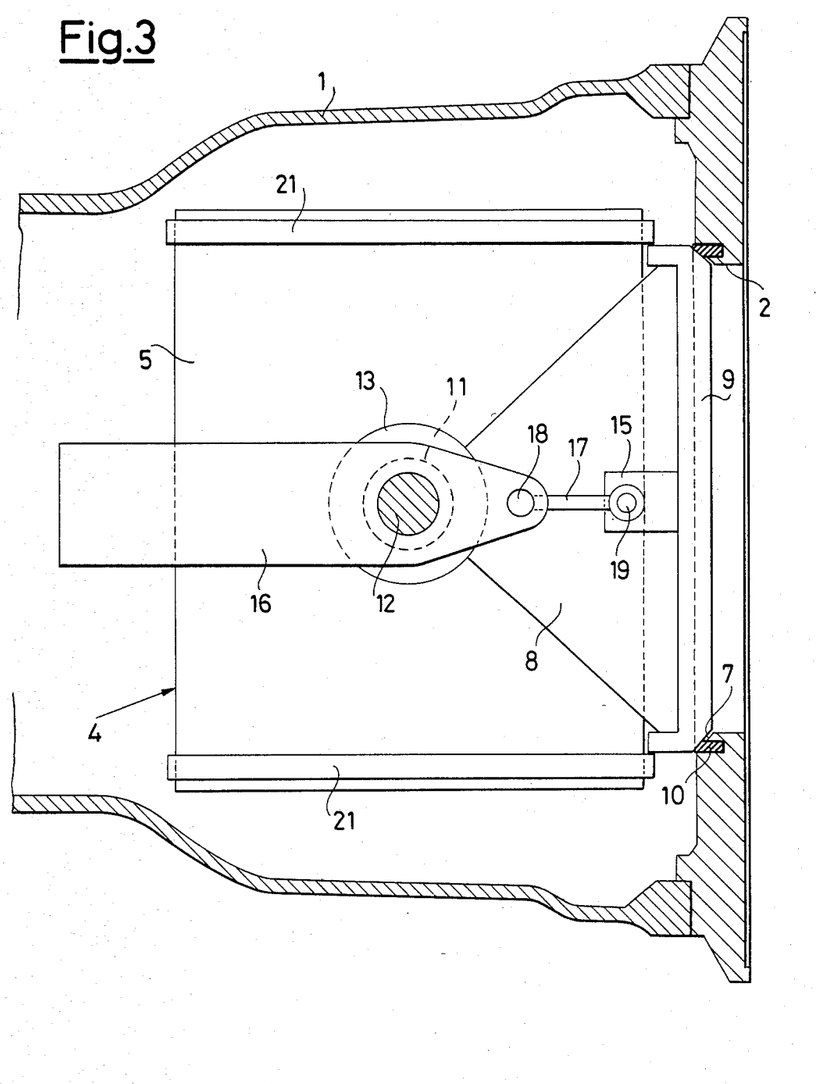
Figure 4:
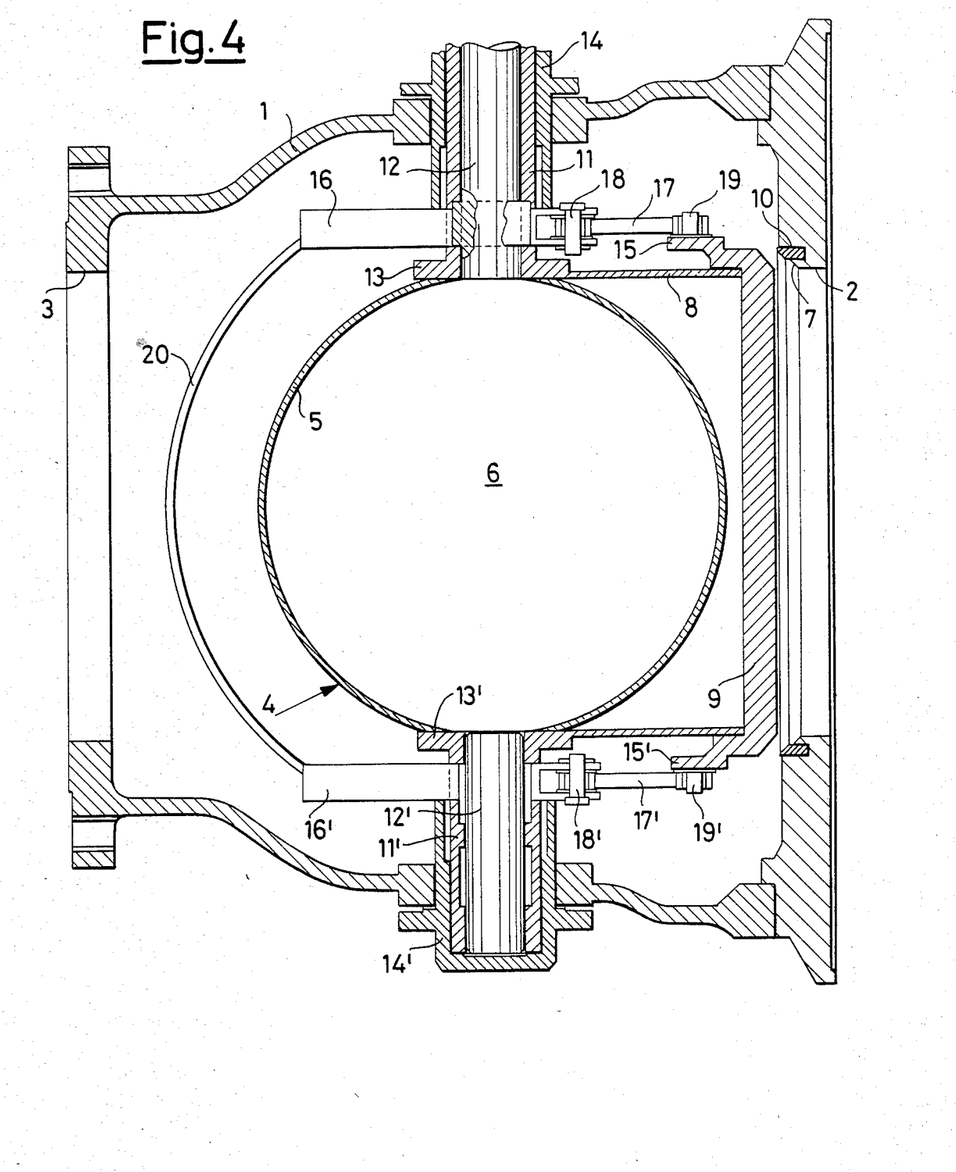
FIG. 4 shows said valve in axial section along line IV—IV of FIG. 2.

The "ball" 4 substantially comprises a cylindrical body 5, which is passed through by an axial hole 6 and is rotating around an axis perpendicular to the axis of the hole 6 and to that of the outer body or duct section 1 among the opening position of FIG. 1 and those, rotated of 90°, illustrated in FIGS. 2-4. From said rotating body 5 there extends perpendicularly to the axis of the hole 6 and to the rotation axis of the body 5 an approximately cylindrical transversal prolongation 8, on whose free end there is slidingly mounted, between two lateral retaining rings 21, a translatory shutter constituted by a truncated-cone plate 9 which can be seal-tight coupled (FIG. 3) with an annular gasket 10 fitted in a corresponding annular cavity of a fixed seat 7 realized at the inlet (or outlet) hole 2 of the fixed outer body 1.

The movement of the ball 4, i.e. the rotation of the cylindrical body 5 and the translation of its translatory shutter 9, is controlled in sequence through two coaxial rotating bodies which, doubled for support and simmetry purposes at the opposite part of the ball (where they are indicated with the same reference numbers provided with "I") include an inner shaft 12 and an outer sleeve 11. The outer sleeve 11, as well as its symmetric on the opposite part of the ball, is connected to a terminal flange 13 integral with the cylindrical body 5 and is in its turn rotatably housed in a fixed tubular structure 14 rigidly connected to the outer body of the valve (FIG. 4). The inner shaft 12, as well as its symmetric on the ball opposite parts, is in its turn operatively connected to a projecting bracket 15 of the translatory shutter 9 through a connecting rod assembly constituted by a crank 16 rigidly fixed to the shaft 12 and by a connecting rod 17 pivoted at 18 and 19 between the crank 16 and the bracket 15. Ribs 20 are placed at rigid connection of the two opposite cranks 16 and 16'.

Figure 5:
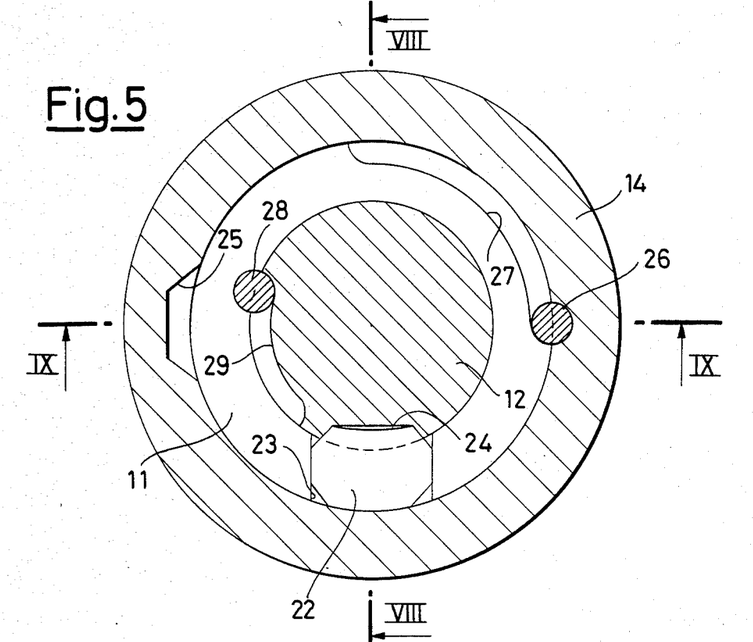
FIG. 5 shows, in section transversal to the rotation axis of the ball, according to a plane passing through line V—V of FIG. 9, the control device of the ball, as it appears in the opening condition of FIG. 1.
Figure 6:
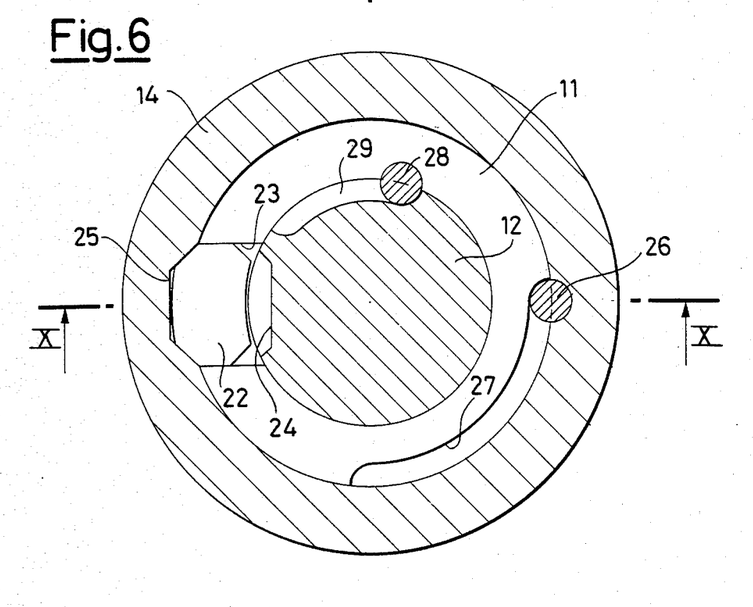
FIGS. 6 and 7 are views similar to FIG. 5, which show said control device in the conditions corresponding to FIGS. 2 and 3.
Figure 7:
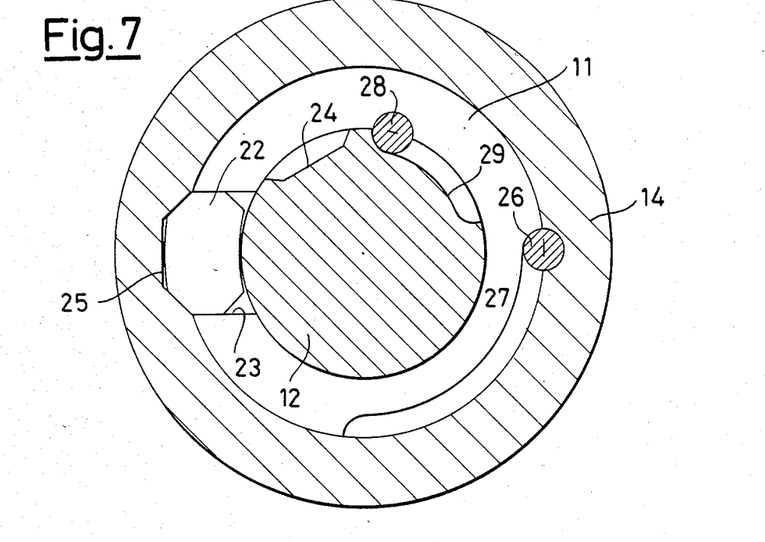
Figure 8:
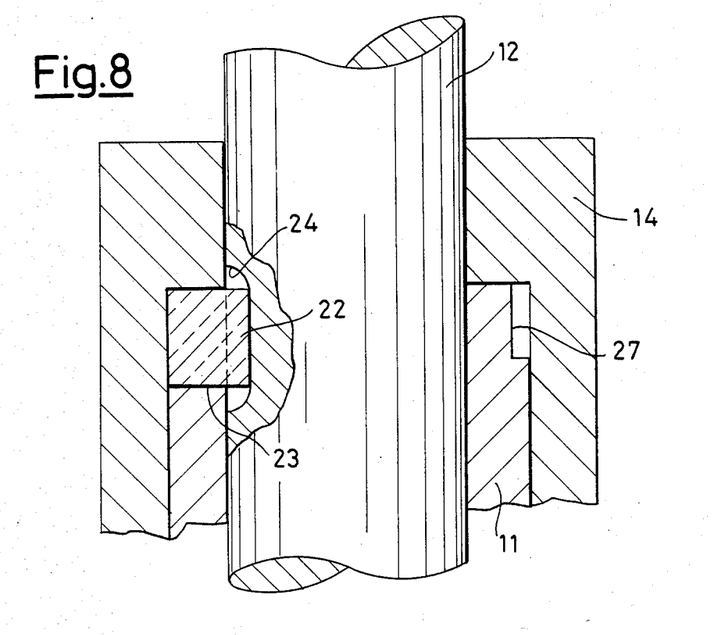
FIG. 8 shows said control device in axial section along line VIII—VIII of FIG. 5.
Figure 9:
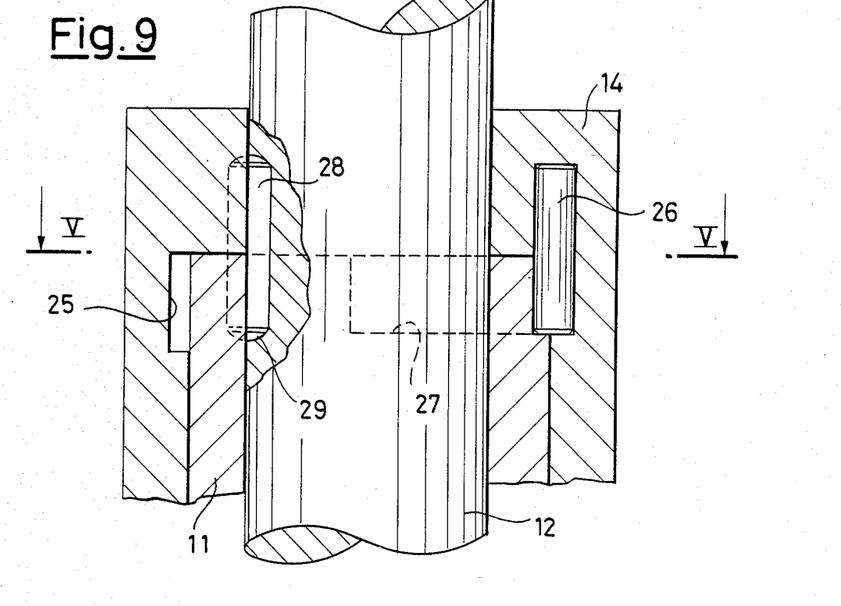
FIG. 9 shows said control device in axial section along line IX—IX of FIG. 5.
Figure 10:
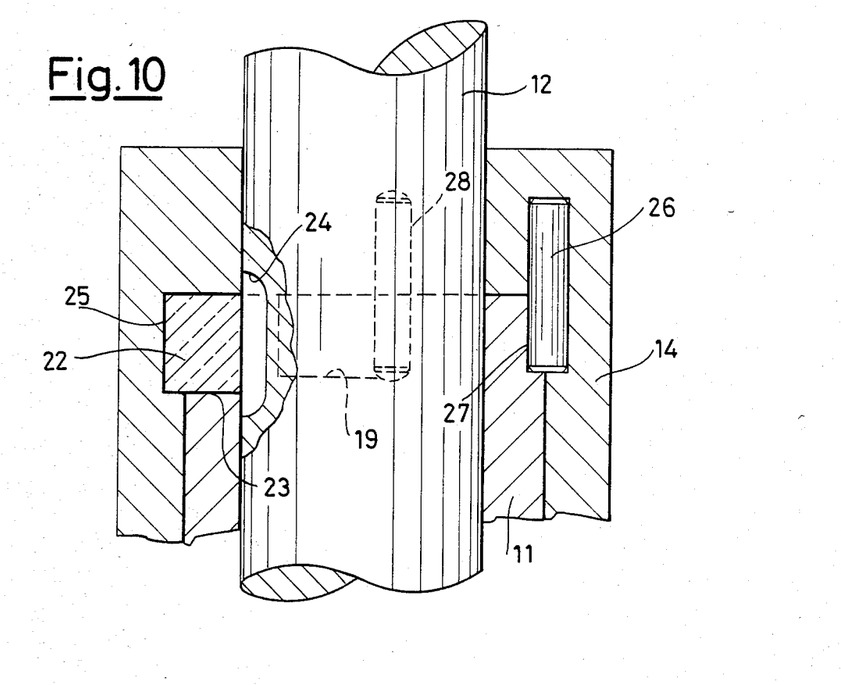
FIG. 10 shows said control device in axial section along line X—X of FIG. 6.

The rotations of the inner shaft 12 and of the outer sleeve 11 are obtained, either integrally or not, through a control device which is shown in details in FIGS. 5–10. From them it can be noted that the shaft 12, which constitutes the control shaft of the device, becomes integral or not with the outer sleeve 11, which in its turn can become integral or not with the fixed structure 14, according to the position of a shaped pawl 22 housed in an opening 23 of the wall of the sleeve 11 and alternatively movable between a radially withdrawn position in which it is partially housed in an axial cavity 24 of the shaft 12 (FIGS. 5 and 8) and a radially projecting position in which it is partially housed in a similar axial cavity 25 of the fixed structure 14 (FIGS. 6, 7 and 10).

Besides there are provided means for limiting the rotation strokes of the sleeves 11 and the shaft 12, which means are respectively constituted by an axial pin 26 incorporated into the fixed structure 14 and partially extending in a peripheral slot 27 (about 90° of extension) of the sleeve 11 (FIGS. 5–9) and by another axial pin 28 incorporated in the sleeve 11 and partially extending in a peripheral slot 29 of the control shaft 12 (FIGS. 5–7, 9 and 10).

The above described device makes possible, with one control, the sequential movement of the ball 4 from the opening position of FIG. 1 to the closing position of FIG. 3, by causing firstly a movement of single rotation of the cylindric body 5 (and consequently of the traslatory shutter 9) towards the intermediate position of FIG. 2 and then a movement of single final translation of the shutter 9 with the cylindrical body 5 already stopped.

In order to understand how one can obtain this, one supposes to be in the opening position of FIG. 1, to which corresponds, for the control device, that of the starting of the movement which is indicated in FIGS. 5, 8 and 9. In such a position the pawl 22 is partially fitted into the cavity 24 of the control shaft 12, which is therefore integral with the sleeve 11. A first angle of clockwise rotation (looking at FIGS. 5–7) of the control shaft 12 causes therefore the integral rotation of the same control shaft and of the sleeve 11 from the position of FIG. 5 to the position of FIG. 6, and therefore of the whole ball 4 from the opening position of FIG. 1 to the intermediate position of FIGS. 2 and 4. Such an integral rotation ends when the axial pin 26 abuts with the downstream end of the slot 27, thereby preventing the further clockwise rotation of the sleeve 11.

As the clockwise rotation of the control shaft 12, on the contrary, is going on, the shaped pawl 22 receives from the correspondingly shaped lateral wall of the axial cavity 24 an outwardly directed radial thrust which, by taking advantage of the fact that the cavity 24 and the opening 23 are in the meantime in front of the fixed cavity 25, obliges the pawl 22 to go out of the cavity 24 of the cylinder 12 and to fit into the fixed cavity 25 (situation illustrated in FIGS. 6 and 10). The sleeve is thus released from the control shaft 12 and, on the contrary, made integral with the fixed structure 14, so that, while the same sleeve keeps the cylindrical body 5 of the ball 4 immovable, the shaft 12 can rotate through a second rotation angle to control, through the operative connection formed by the crank 16 and by the connecting rod 17 (and corresponding members at the opposite part of the ball), the final translation of the shutter 9 from the intermediate position of FIGS. 2 and 4 to the closing position of FIG. 3, where it engages the fixed seat 7 and the relative gasket 10 in order to assure the desired seal. The movement ends when the axial pin 28 integral with the sleeve 11 has covered the whole extension of the slot 29 of the shaft 12 (FIG. 7).

For the opening of the valve one obviously operates in the opposite way, that is, beginning from the closing position of FIGS. 3 and 7, one rotates counterclockwise the control shaft 12, which at the beginning rotates alone up to the position of FIGS. 6 and 10 and therefore causes the backwards translation of the shutter 9 from the position of FIG. 3 to that of FIG. 2. When the axial pin 28 abuts with the downstream end of the slot 29 of the shaft 12, the connection between the shaft 12 and the sleeve 11 is restored and at the same time the pawl 22 receives from the lateral wall of the fixed cavity 25 an inwardly directed thrust which obliges it to go out of the above mentioned fixed cavity and to fit in the front axial cavity 24 of the shaft 12. From the movement on, and up to the abutment of the axial pin 26 with the other end of the slot 27 (FIGS. 5 and 8), the shaft 12 and the sleeve 11 integrally continue the counterclockwise rotation, causing in such a way the corresponding rotation of the ball 4 from the intermediate position on FIGS. 2 and 4 to that of opening of FIG. 1.

A single control has caused, as it has been seen, firstly the closure and then the opening of the valve, by actuating a sequential movement of rotation and translation, and viceversa, which is suitable to allow the perfect operation and the perfect seal of the valve also in condition of very high and very low temperature.

Figure 11:
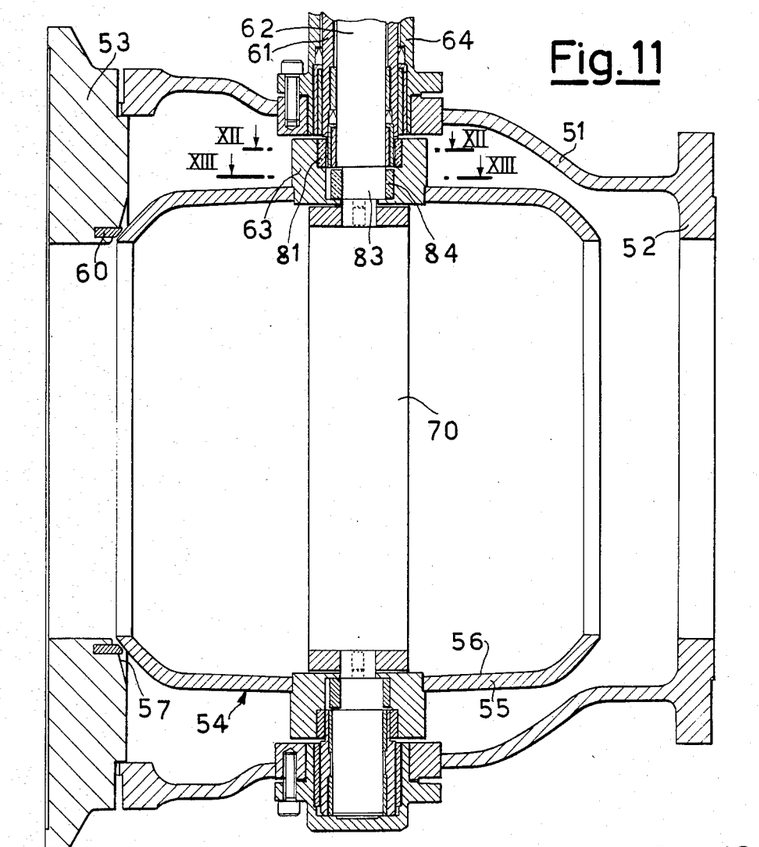
FIG. 11 shows in axial section another ball valve according to the invention, seen in opening position.
Figure 12:
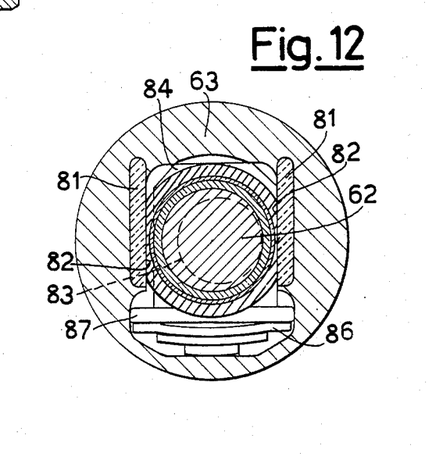
FIGS. 12 and 13 show details of said other valve, respectively in section along lines XII—XII and XIII—XIII of FIG. 11.

Making now reference to FIGS. 11–12, there is illustrated a different but substantially similar embodiment of the present invention, which inside a fixed outer body 51 realized in the shape of a duct section and provided with opposite holes or mouth 52 and 53 for the inlet and outlet of the fluid product houses a control member or "ball" 54 with sequential movement of rotation and translation.

Figure 14:
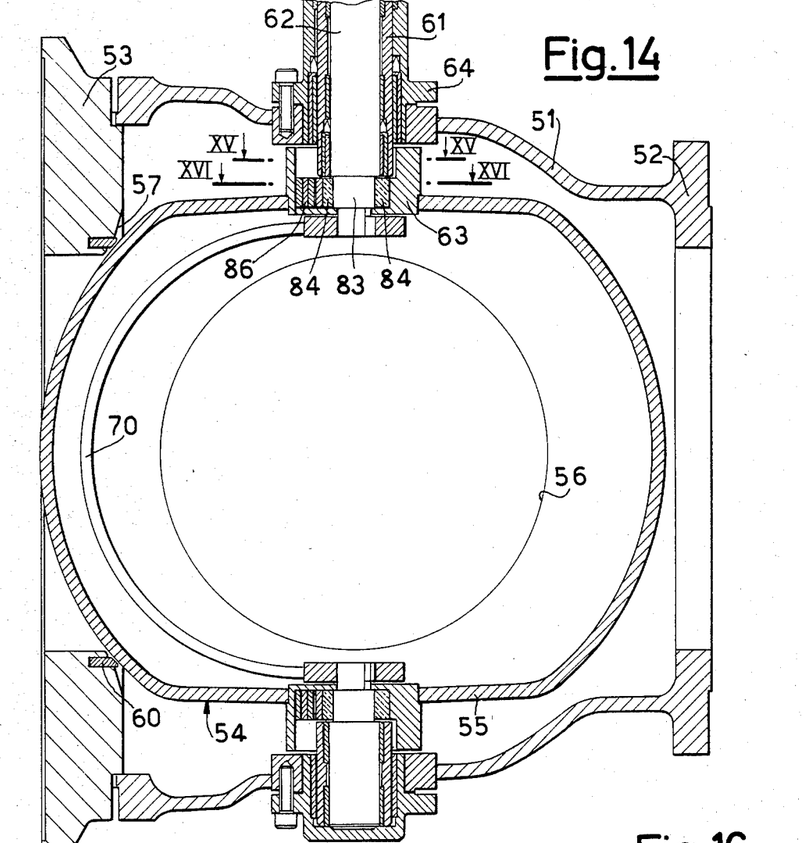
FIG. 14 shows in axial section said other valve, seen in intermediate position of rotation without translation.

The "ball" 54 is this time formed by an approximately spherical body 55 with through hole 56, which is rotatable around an axis perpendicular to the axis of the hole 56 and of the outer body or duct section 51 between the opening position of FIG. 11 and that, rotated of 90°, illustrated in FIG. 14. As it will be seen later, the ball 54 is also capable to translate in a direction parallel to the axis of its through hole 56, from the back position of FIG. 14 to the advanced or closure position of FIG. 17. In this latter position the ball body seal-tight engages with an annular gasket 60 fitted in a corresponding annular recess of a fixed seat 57 realized at the inlet (or outlet) 52 of the duct section 51.

Figure 13:
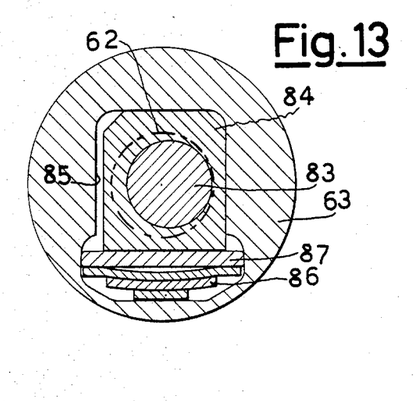
Figure 15:
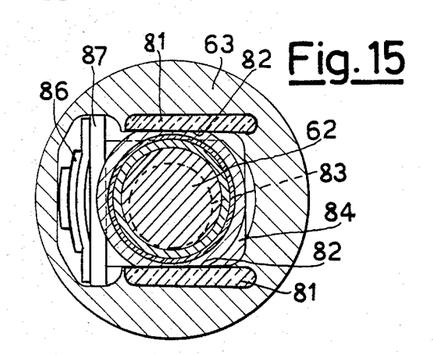
FIGS. 15 and 16 show the same details of FIGS. 12 and 13, respectively in section along lines XV—XV and XVI—XVI of FIG. 14.
Figure 18:
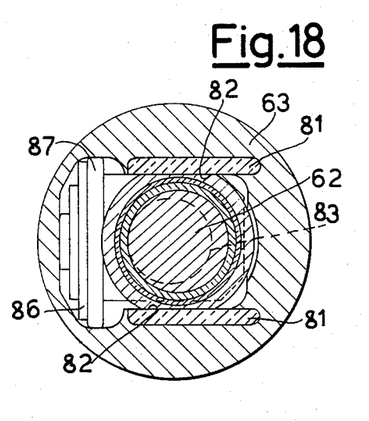
FIGS. 18 and 19 show the same details of FIGS. 12 and 13, as well as 15 and 16, respectively in section along lines XVIII—XVIII and XIX—XIX of FIG. 17.

The two ball movements (rotation and translation) are controlled in sequence through two rotating coaxial bodies which, doubled for support and simmetry purposes on the opposite part of the ball, are respectively consituted by an inner shaft 62 and by an outer sleeve 61, coaxially disposed inside a fixed tubular structure 64. More precisely, the ball 54 is made integral, from diametrally opposite parts, with a pair of cylindrical hubs 63 everyone of which is linked for the rotation to the above mentioned outer sleeve 61 through the engagement of two shoulders 81 integral with the hub 63 with rectilinear bevels 82 of the end of the sleeve 61 (FIGS. 12, 15 and 18). At the same time, always through the above mentioned engagement, the hub 63 is radially made translatory with respect to the sleeve 61, this time under the control of an eccentric appendix 83 of the inner shaft 62, on which there is rotatably mounted a rectangular slide 84 (FIGS. 13, 16 and 19) slidingly, but not rotatably, housed in a corresponding cavity 85 of the hub 63. Springs 86 react between a front wall 87 of the slide 84 and the near end of the cavity 85 to yieldingly stress the hub 63 to a position radially moved with respect to the shaft 62 for the purposes which will be clarified later on. A rib 70 connects the appendix 83 with its diametrically opposed counterpart, so as to assure the due movement identity.

Figures 20, 21, 22:
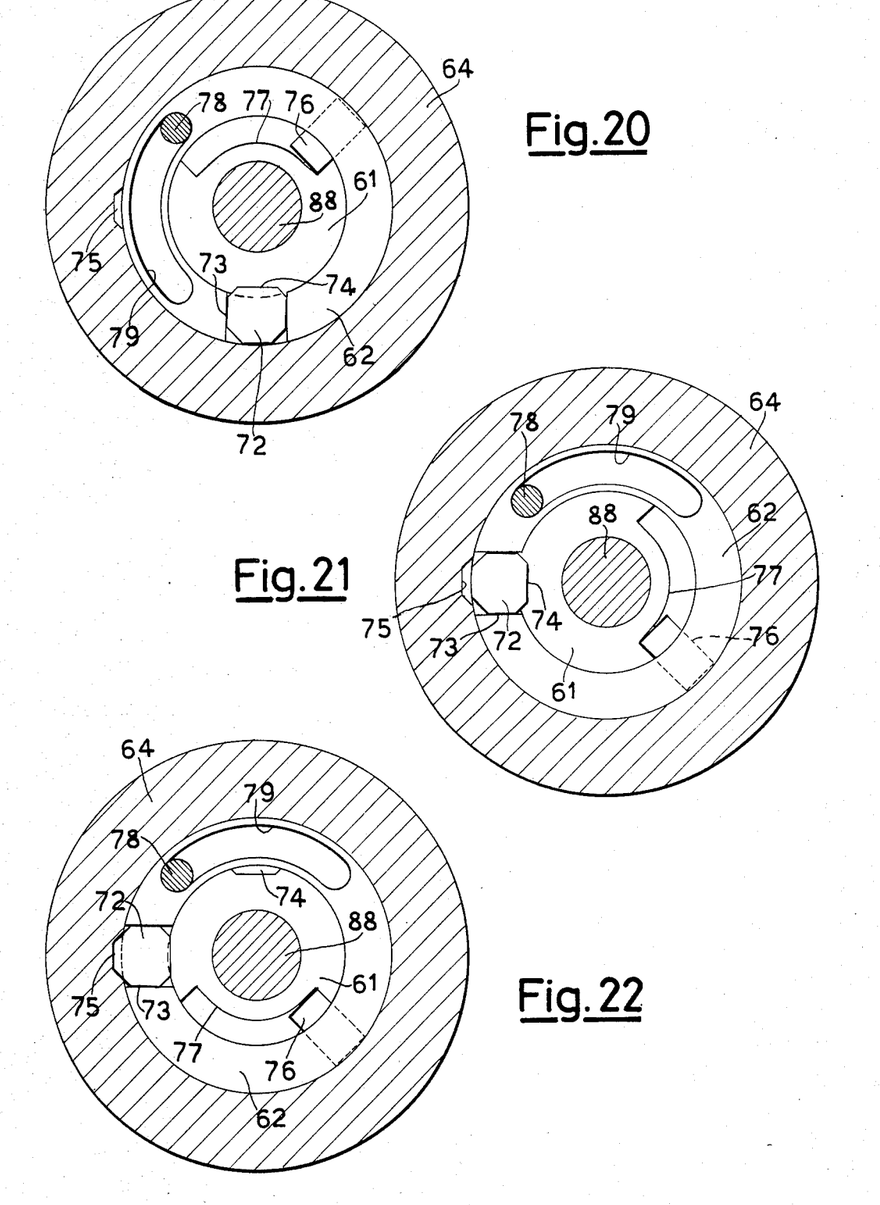
FIGS. 20, 21 and 22 show, in transversal section to the rotation axis of the ball, the control device comprised in said other valve, respectively in the closing, intermediate rotation without translation and closing positions.

The rotation of the inner shaft 62 and the outer sleeve 61 is driven by a control device which is illustrated in FIGS. 20-22 and is substantially identical to that associated to the valve of FIGS. 1-4 and already described with reference to FIGS. 5-10. In order to avoid to repeat the structural description we will therefore limit to point out that for the corresponding parts there have been used reference numbers increased of 50 and that the only variations relate to the pin 78, now radially disposed, and the slot 77, now no longer peripheral but passing through the sleeve 61. In FIGS. 20-22 there is also shown a control shaft 88 realized integral with the shaft 62.

From all of this the following way of operation of the valve illustrated in FIGS. 11-22 results.

In the opening position of FIG. 11 the ball 64 has its own spherical body 55 moved away from the annular gasket 60 and disposed with the through hole 56 aligned with the axis of the duct section 51. The hub 63 and the slide 83, as well as their diametrically opposed counterparts, are in their turn in the respective positions illustrated in FIGS. 12 and 13. The control device is finally in the position of FIG. 20, with the pawl 72 partially fitted in the cavity 74 of the shaft 62, which is therefore made integral with the sleeve 61.

Figure 16:
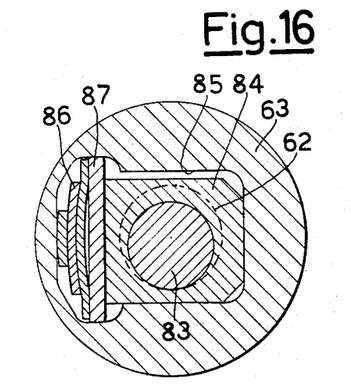

Starting from this position, a first clockwise rotation angle (looking at FIG. 20) of the control shaft 88 causes the integral rotation of the shaft 62 and of the sleeve 61 from the position of FIG. 10 to the position of FIG. 21. The result is that the slide 84 and the hub 63 in their turn rotate integrally with the sleeve 61, moving from the position of FIGS. 12 and 13 to that of FIGS. 15 and 16. The ball 54 correspondingly rotates (without translation) around the common axis of the shaft 62 and of the sleeve 61 from the opening position of FIG. 11 to the intermediate one of FIG. 14, where the through hole 56 is directed perpendicular to the axis of the duct section 51 but the spherical body 55 is still moved away from the gasket 60. The valve is therefore still open, but ready for the final closure. The position of FIGS. 14-16 is reached when the pin 76 abuts with the downstream end of the slot 77, thus preventing the further clockwise rotation of the sleeve 61. Such situation is shown in FIG. 21.

Figure 19:
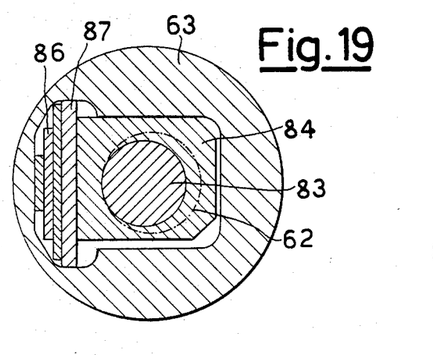

As the clockwise rotation of the control shaft 88 and of the integral inner shaft 62 is going on, the pawl 72 receives from the lateral wall of the axial cavity 74 a radial outwardly directed thrust which allows it to fit itself in the fixed cavity 75, in front of which the same pawl in the meantime is arrived (FIG. 22). The sleeve 61 is thus released from the inner shaft 62, and therefore from the control shaft 88, and on the contrary made integral with the fixed structure 64. The result is that, being unchanged the angular position of the slide 84 and of the hub 63, and consequently of the ball 54, the eccentric appendix 83 continues its rotation, causing the radial sliding of the slide 84 and of the hub 62 with respect to the sleeve 61 and therefore causing the final translation (witout rotation) of the ball 54 up to the engagement position of the spherical body 55 with the annular gasket 60, that is up to the closing position of FIG. 17. By reaching such a position, as shown in FIG. 19, the abutment between the spherical body 55 and the gasket 60 creates a relative sliding between the slide 84 and the hub 63, by the effect of which the springs 86 charge, assuring the spherical body 55 the due sealing pressure against the gasket 60; besides this compensates possible sizing imperfections, progressive wear and so on. The described movement finally ends when the pin 78 integral with the sleeve 61 has passed through the whole extention of the slot 79 of the shaft 62, as illustrated in FIG. 22.

Figure 17:
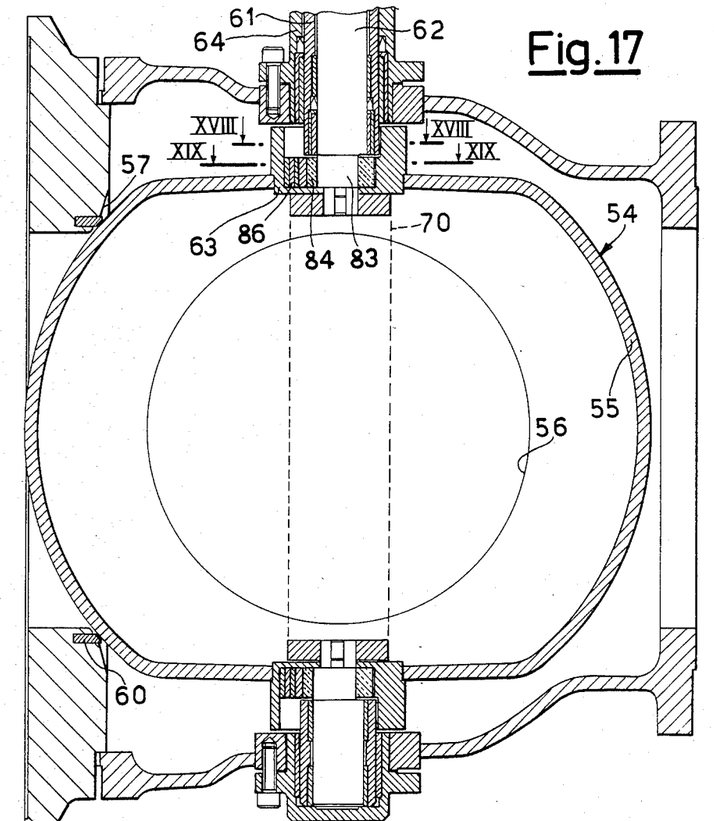
FIG. 17 shows in axial section said other valve, seen in closing position.

For the opening of the valve evidently one operates in the opposite direction, that is one rotates counterclockwise the control shaft 88 to firstly cause the counterclockwise rotation of the inner shaft 62 for the consequent movement of translation of the ball 54 from the closing position of FIG. 17 to the intermediate one of FIG. 14, and then the integral rotation, counterclockwise too, of the inner shaft 62 and of the outer sleeve 61 for the consequent movement of rotation of the ball 54 from the intermediate position of FIG. 14 to the opening one of FIG. 11.

Also in this case, as we have seen, a single control is able to cause the valve closure through a first movement of single rotation and a second movement of single translation (and vice-versa for the opening). This allows the perfect operation of the valve, particularly its perfect seal in closing position, also in very high or very low temperature conditions.

I claim:

1. Ball valve with rotary-translatory movement for controlling the flow of fluid products passing at very high or very low temperatures, comprising a duct section through which can be passed a fluid product, a ball which can be moved to closing and opening positions in said duct section with seqeuntial movements of rotation and translation, and a control device including a single control shaft able to cause each of said sequential movements through the continuous rotation of said control shaft characterized in that said control device comprises further a first rotatable body integral with said control shaft, a second rotatable body, and connection and release means responsive to a closing rotation of said control shaft in one direction to first keep said bodies connected with each other for rotation in unison and to then stop said second body and to free said first body therefrom for rotation relative to said second body, and vice-versa in response to an opening rotation of said control shaft in the opposite direction, and said ball being coupled to said rotatable bodies of the control shaft so that said rotation in unison causes a movement of mere rotation of the ball around an axis perpendicular to that of said duct section, and wherein the rotation of the first body relative to said second body causes a movement of mere translation of said ball in a direction perpendicular to the above first-mentioned axis, said ball comprising an approximately spherically shaped body having thereon a hub connected to said second body for rotation therewith and a slide rotatably mounted on an eccentric on said first body and slidably connected to said hub to impart said translational movement to said spherical body.

2. Ball valve according to claim 1, characterized in that said hub is slidingly coupled to said slide and there are provided elastic means interposed between said hub and said slide in order to yieldingly move said spherical body towards the corresponding sealing seat of said duct section when said ball is in closing position.

3. Ball valve according to claim 1, characterized in that said first body is constituted by an inner shaft integral with said control shaft and said second body is constituted by a sleeve placed coaxially outside said inner shaft and inside a fixed structure, said connection and release means comprising a pawl housed in a radial opening of the wall of said sleeve and alternately movable between a radially withdrawn position in which it is partially inserted in a corresponding cavity of said inner shaft for the connection of said sleeve with said control shaft and a radially projecting position in which said pawl is positioned outside said cavity of the inner shaft and partially inserted in a corresponding cavity in said fixed structure to effect the release of said control shaft and the locking of said sleeve with respect to said fixed structure.

4. Ball valve according to claim 3, characterized in that it comprises means for limiting the beginning and the end of the rotation strokes of said sleeve with respect to the fixed structure and of said inner shaft with respect to said sleeve.

5. Ball valve according to claim 4, characterized in that said limiting means are constituted by pins incorporated in said fixed structure and in said sleeve and partially extending into respective slots in said sleeve and is said inner shaft, respectively.

* * * * *